(12) United States Patent
Garrison et al.

(10) Patent No.: US 8,007,848 B2
(45) Date of Patent: Aug. 30, 2011

(54) PNEUMATIC SEASONING SYSTEM

(75) Inventors: Wayne Garrison, McKinney, TX (US);
Ross D. Samuels, Coppell, TX (US);
Glynn R. Bartlett, Boerne, TX (US)

(73) Assignee: Frito-Lay North America, Inc., Plano, TX (US)

( * ) Notice: Subject to any disclaimer, the term of this patent is extended or adjusted under 35 U.S.C. 154(b) by 0 days.

(21) Appl. No.: 12/896,557

(22) Filed: Oct. 1, 2010

(65) Prior Publication Data
US 2011/0020514 A1 Jan. 27, 2011

Related U.S. Application Data

(62) Division of application No. 11/678,195, filed on Feb. 23, 2007, now Pat. No. 7,827,929.

(51) Int. Cl.
*A23G 3/20* (2006.01)

(52) U.S. Cl. ........ 426/294; 426/442; 426/302; 118/311; 239/487; 239/405; 99/474

(58) Field of Classification Search .................. 426/302, 426/303, 442, 289, 294; 239/405, 463, 143, 239/423, 424.5, 424, 425, 399, 461, 487; 118/308, 309, 310, 311
See application file for complete search history.

(56) References Cited

U.S. PATENT DOCUMENTS

| | | | | |
|---|---|---|---|---|
| 6,588,363 B1 * | 7/2003 | Burke et al. | | 118/13 |
| 2005/0263617 A1 * | 12/2005 | Thong | | 239/383 |
| 2006/0159811 A1 * | 7/2006 | Cosby et al. | | 426/307 |

* cited by examiner

*Primary Examiner* — Drew E Becker
*Assistant Examiner* — Preston Smith
(74) *Attorney, Agent, or Firm* — James R. Gourley; Colin P. Cahoon; Carstens & Cahoon, LLP

(57) ABSTRACT

A pneumatic seasoning system and method utilizing a rotating drum for seasoning, a funnel-fed pneumatic eductor, line splitters, and a plurality of specially-designed swirl-inducing nozzle spools for inducing a broad and even seasoning plume. In a preferred embodiment, a pneumatic seasoning system transports seasoning from a seasoning hopper to food items within a rotating drum using a combination of an eductor and four in-line vacuum generators, which vacuum generators operate on compressed air. Each vacuum generator comprises a distributing nozzle roughly shaped like a collared spool, wherein compressed air is supplied to the annular region defined between the spool and its collar, and said compressed air exits through swirl ports distributed about the circumference of the spool exit. Each swirl port preferably has a pitch angle of 15° and a yaw angle of 15°.

7 Claims, 7 Drawing Sheets

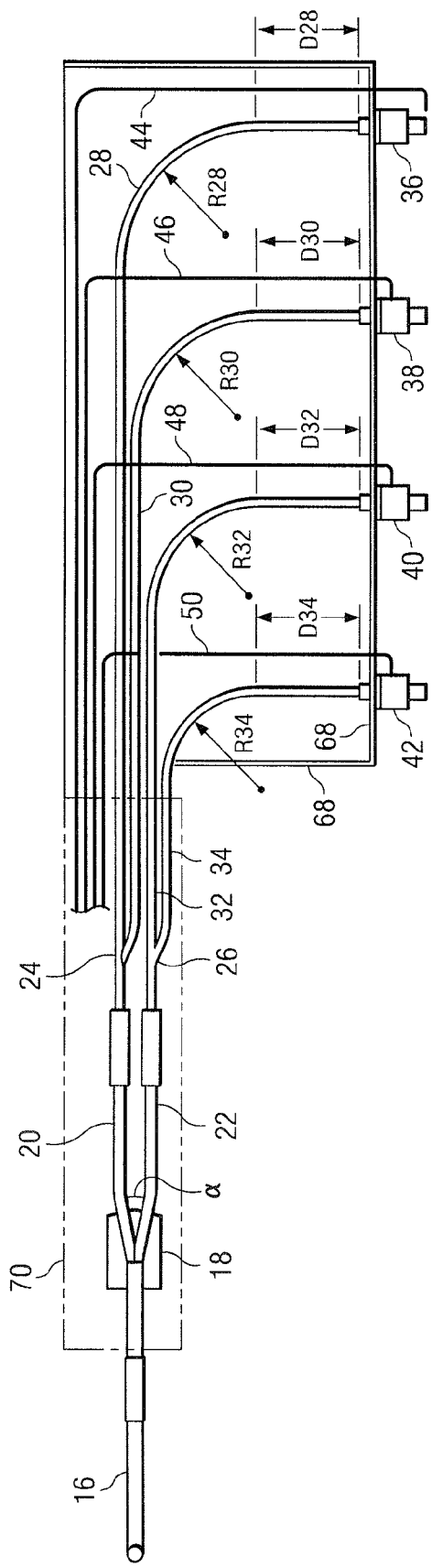
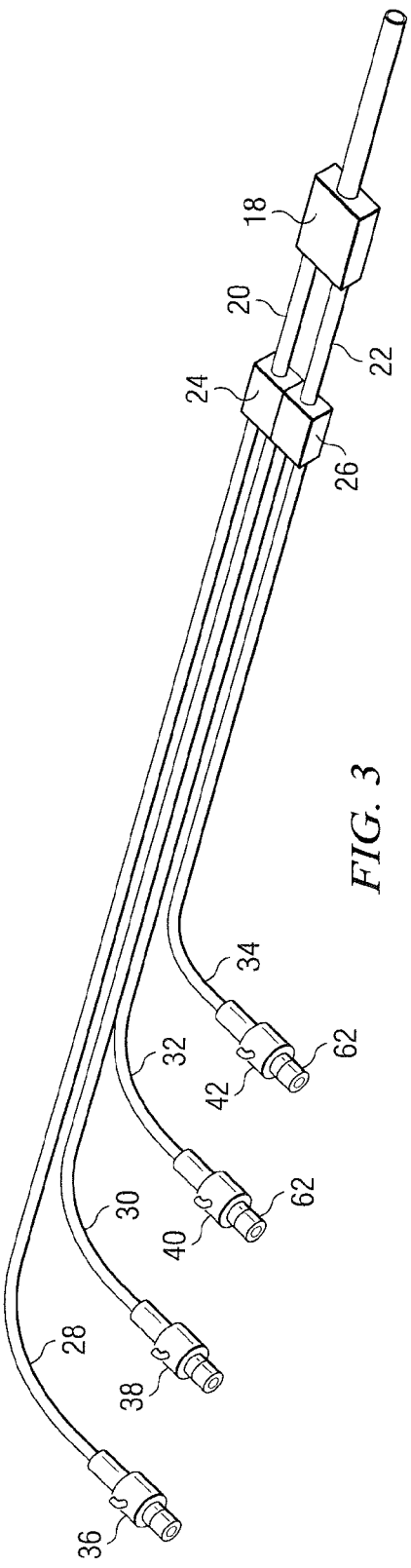
FIG. 2
FIG. 3

PNEUMATIC SEASONING SYSTEM

CROSS-REFERENCE TO RELATED APPLICATION

This application is a divisional of co-pending U.S. patent application Ser. No. 11/678,195, filed Feb. 23, 2007, the technical disclosure of which is hereby incorporated by reference in its entirety.

BACKGROUND OF THE INVENTION

1. Technical Field

The present invention relates to a pneumatic seasoning system and method for evenly and consistently applying seasoning material to a food product, especially farinaceous-based food products. More specifically, the invention offers improved rotating drum-type seasoning by combining the use of a pneumatic eductor and one or more in-line vacuum-generating swirl-inducing nozzles.

2. Description of Related Art

Snack food products, particularly seasoned snacks chips, are eaten and enjoyed by consumers. For example, potato chips, tortilla chips, corn chips, and the like often include one or more seasonings added to the snack chips after cooking but prior to packaging. To season, snack chips are typically seasoned by sprinkling one or more seasonings onto the surface of the chip products. The surfaces of the chips after seasoning provide a desirable and interesting appearance and immediate flavor to the palate upon consumption. Some common seasonings that consumers prefer, for example, include salt, barbecue flavor, sour cream and onion flavor, vinegar flavor, cheese, and others. Some of these seasonings are hygroscopic and readily absorb oil.

Seasoning is typically coated onto the surface of chips after cooking. Typically, this is advantageous in that after cooking, particularly with frying, the surface of the chips retain a surface coating of oil and are hot. When the powdered seasoning is deposited onto the exterior surface of the chips, a portion of the seasoning powder is retained.

Present techniques for distributing seasoning onto snack chips include tumbling the chips in a rotating cylindrical drum containing seasoning and sprinkling seasoning onto chips as they pass under a seasoning applicator. For example, with a rotating cylindrical drum, unseasoned snack chips enter the drum at an elevated end through a funnel. Seasoning is fed through a dispenser into an interior portion of the drum so as to coat the rotating chips. Internal baffles lift and tumble the chips to promote even coverage of seasoning as the chips are drawn toward the bottom of the drum via gravity. Thereafter, seasoned chips exit the drum and are packaged.

Seasoning is typically delivered into a seasoning drum via a screw feeder or a vibratory feeding device and then applied to product by the force of gravity alone. Unless the product is particularly moist or has an oily surface, such seasoning delivery methods do not quite achieve a desirable level of coverage or consistency. Consequently, in most prior art drum-type seasoning applicators, successful coating of the end product requires pre-seasoning application of a bonding solution or other liquid—such as sugar solution, oil, or lecithin. While the combination of seasoning drop-on and product pre-coating can be used to achieve the desired coverage, such simultaneous application of powder and liquid in close proximity introduces a high degree of complexity in controlling the seasoning process. For example, spray slurries can clog nozzles or accumulate around spray ports, altering spray patterns and ultimately preventing product uniformity. Slurry concentration, slurry temperature, spray droplet size, and product holding time, can all affect seasoning distribution, seasoning adhesion, and thus also affect product flavor and color.

Consequently, a need exists for a seasoning apparatus and process capable of applying seasoning onto snack products consistently and efficiently while keeping the overall degree of complexity to a minimum. In particular, an improved drum-type seasoning applicator would be capable of applying seasoning uniformly to food products—such as snack chips, snack crisps, and other farinaceous products—without the need for pre-seasoning liquid spray application or post-seasoning drying.

SUMMARY OF THE INVENTION

Traditional topical seasoning technology distributes seasoning via a drop-on seasoning curtain, where seasoning simply falls (propelled by the force of gravity alone) off of a vibratory feeding plate or is delivered via auger (or rotating screw) to a horizontally positioned, slotted, rotating shaft (or cylinder). In such prior art systems, where the primary motivating force of the seasoning is gravity, the effectiveness of coating relies heavily on the use of, and adhesion characteristics of, a pre-seasoning oil spray. Due to the compounded variability of pre-seasoning oil application and seasoning application, topical uniformity and adhesion are not optimal.

In contrast, the primary differentiator for the pneumatic system of the present invention is the utilization of an in-line pneumatic vacuum nozzle to propel the seasoning onto the chip (or other food item) pieces. A specially designed spool-shaped nozzle introduces a swirling envelope of air around a dilute-phase pneumatic flow of seasoning to promote uniform particle distribution. A plurality of compressed-air ports arranged about the down-stream annulus of the nozzle provide the vacuum force used to create a turbulent swirling flow at the nozzle exit.

A prescribed number of nozzles are designed into the system to provide the proper product coverage and seasoning capacity. These nozzles are mechanically tied together via a line splitters and can be fed from a common volumetric or loss-in-weight feeder. The motive force and relatively high-velocity impact of the seasoning particles, which is on the order of roughly 30 fps, promotes superior adhesion and/or implantation to the product to be coated. Desirable adhesion and uniform distribution are possible without the use of a pre-seasoning oil spray.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 2 is a schematic partial side elevational view of a preferred embodiment of the present invention showing a plurality of pneumatic transport tubes, line splitters, and nozzles;

FIG. 3 is a partial side perspective view of the pneumatic transport tubes, line splitters, and nozzles shown in FIG. 2;

Figure 1:
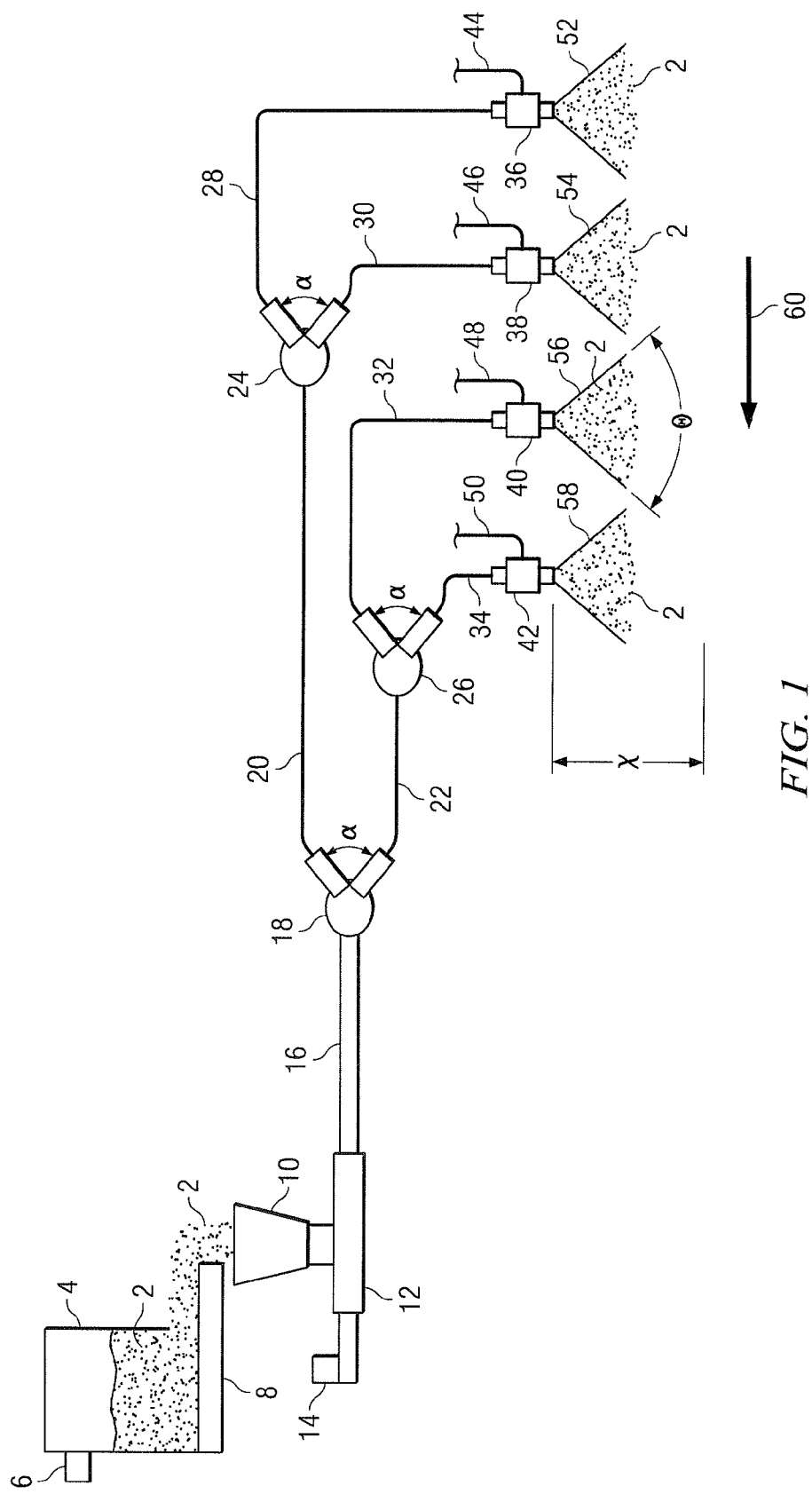
FIG. 1 is a schematic side elevational view of an apparatus for pneumatically delivering seasoning to a food product in accordance with a preferred embodiment of the present invention.

| REFERENCE NUMERALS | |
|---|---|
| 2 | seasoning |
| 4 | seasoning hopper |
| 6 | level meter |
| 8 | seasoning feeder |
| 10 | funnel |
| 12 | pneumatic eductor |
| 14 | air flow meter |
| 16 | first transport tube |
| 18 | first line splitter |
| 20 | second transport tube |
| 22 | third transport tube |
| 24 | second line splitter |
| 26 | third line splitter |
| 28 | fourth transport tube |
| 30 | fifth transport tube |
| 32 | sixth transport tube |
| 34 | seventh transport tube |
| 36 | first nozzle |
| 38 | second nozzle |
| 40 | third nozzle |
| 42 | fourth nozzle |
| 44 | compressed air for first nozzle |
| 46 | compressed air for second nozzle |
| 48 | compressed air for third nozzle |
| 50 | compressed air for fourth nozzle |
| 52 | first plume |
| 54 | second plume |
| 56 | third plume |
| 58 | fourth plume |
| 60 | product flow |
| 62 | nozzle exit |
| 64 | drum |
| 66 | longitudinal baffles |
| 68 | support bracing |
| 70 | conduit |
| 72 | nozzle spool |
| 74 | spool core |
| 76 | first flange |
| 78 | second flange |
| 80 | annular face |
| 82 | central passage |
| 84 | swirl ports |
| 86 | compressed-air cowling |
| 88 | annular swirl-port-feeding chamber |

-continued

| REFERENCE NUMERALS | |
|---|---|
| 90 | compressed air inlet |
| 92 | tapering portion of the cowling |
| 94 | cowling outlet |
| 96 | throat extension |
| α | splitter angle |
| θ | plume distribution angle |
| χ | stand-off distance from product |
| R28 | radius of curvature of the fourth transport tube |
| R30 | radius of curvature of the fifth transport tube |
| R32 | radius of curvature of the sixth transport tube |
| R34 | radius of curvature of the seventh transport tube |
| D28 | straight distance to the first nozzle |
| D30 | straight distance to the second nozzle |
| D32 | straight distance to the third nozzle |
| D34 | straight distance to the fourth nozzle |
| L72 | spool length |
| L76-78 | flange section length |
| τ84 | yaw angle |
| D74 | spool core diameter |
| α84 | pitch angle |
| Φ | radian interval |
| ID72 | inner diameter of the spool core |
| OD72 | outer diameter of the flanges |
| OD74 | outer diameter at the spool core end |
| α80 | bevel angle of the annular face |

DETAILED DESCRIPTION

In the following written description, and with reference to all the figures, the use of shared reference numerals and shared reference characters denotes the same or similar elements throughout the figures, unless otherwise stated. Note that while one or more embodiments are discussed in detail herein, such embodiments are not meant to be exclusive, and obvious and/or foreseeable variants are also encompassed by the present invention.

While pneumatic seasoning distributors have been used in conjunction with pre-seasoning oil sprays in the prior art, such systems tend to rely upon the adhesive characteristics of such pre-seasoning oil sprays: more specifically, the ability of such spray coatings to capture free-falling seasoning particles without becoming so adhesive or tacky as to cause undesirable product clumping, or in the other extreme, remaining so fluid as to drain off of the product. Rather than relying upon the use of pre-seasoning oil sprays, the present invention instead benefits from an emphasis on pneumatic transport and control. Instead of simply using pneumatic transport as merely another means for distributing seasoning at relatively low velocities—such as those obtained by traditional free-fall or drop-on methods of seasoning—the present invention emphasizes using pneumatic transport and in-line vacuum generators to propel seasoning particles with significantly more kinetic energy onto the product to be seasoned, thereby enhancing product retention of seasoning. Moreover, the specific placement of vacuum-generating compressed-air outlet ports promotes a turbulent swirling seasoning plume 52, 54, 56, 58, which uniformly distributes seasoning and, in some cases, effectively doubles or triples the possible area of distribution.

Figure 4:
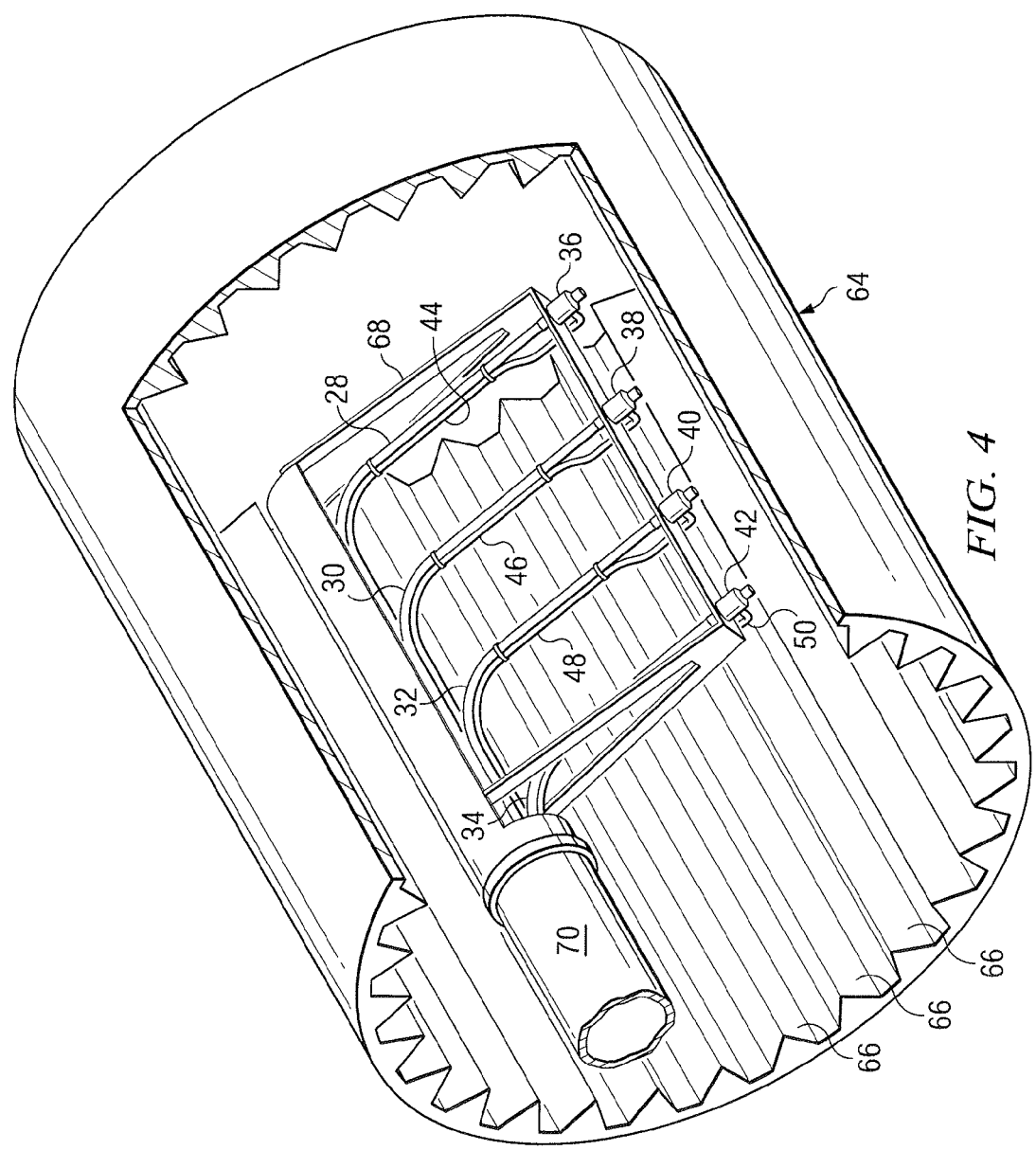
FIG. 4 is a partial side perspective view of a seasoning drum with a cut-away portion showing the pneumatic transport tubes and nozzles contained therein.
Figure 5:
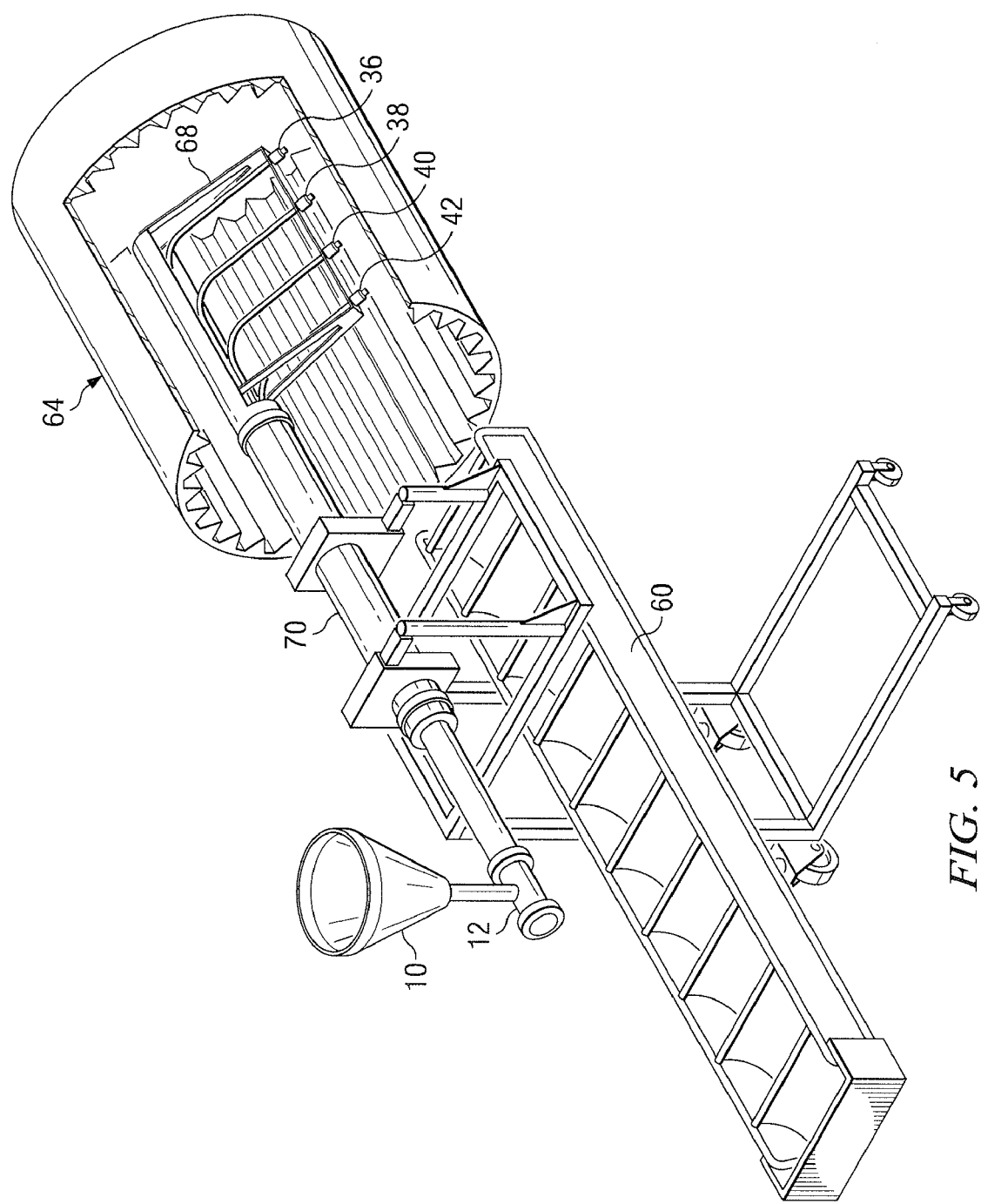
FIG. 5 is a side perspective view of a pneumatic seasoning system in accordance with a preferred embodiment of the present invention.
Figure 6A:
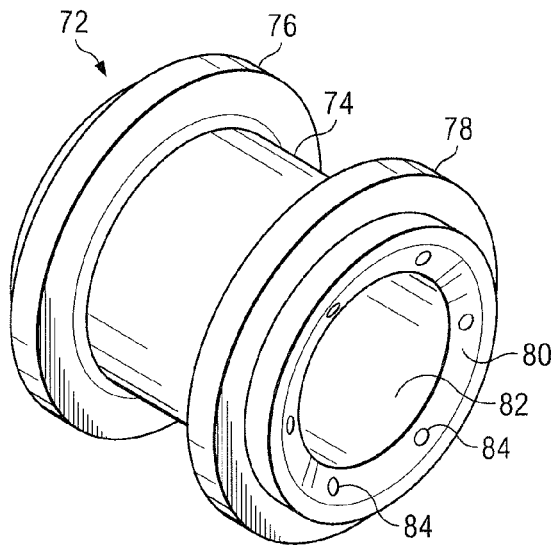
FIG. 6A is a perspective view of a nozzle spool in accordance with a preferred embodiment.
Figure 6C:
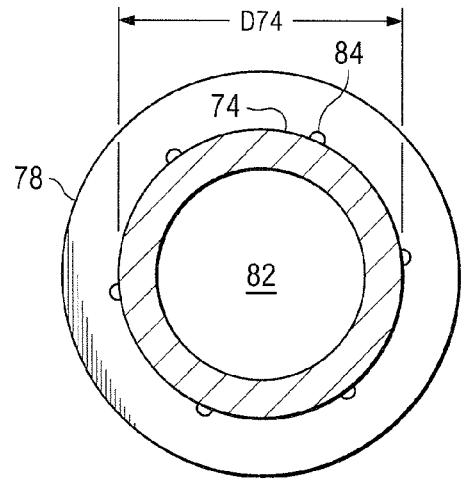
FIG. 6C is a cross-sectional view of the nozzle spool shown in FIG. 6B and taken at line 6C-6C.
Figure 6B:
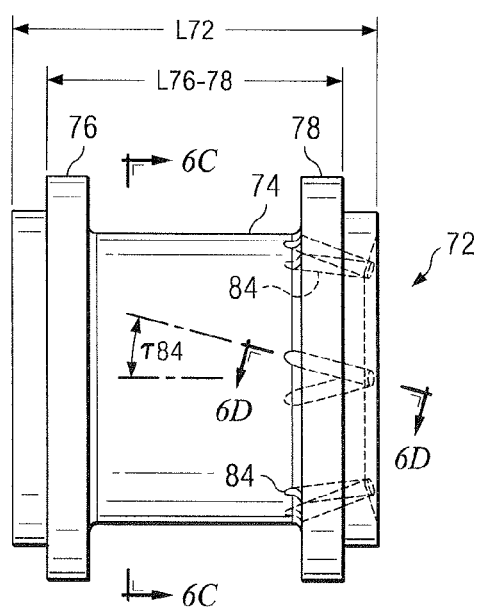
FIG. 6B is a side cross-sectional view of the nozzle spool shown in FIG. 6A.
Figure 6D:
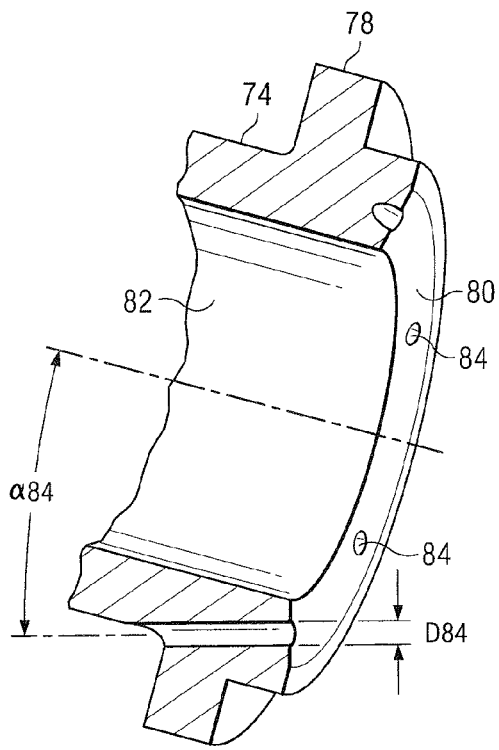
FIG. 6D is a cross-sectional view of the nozzle spool shown in FIG. 6B and taken at line 6D-6D.
Figure 6E:
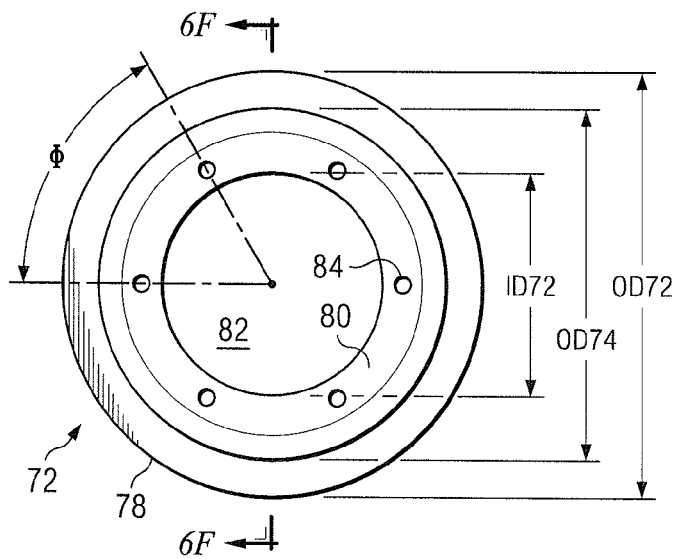
FIG. 6E is a front side elevational view of the nozzle spool shown in FIG. 6A.
Figure 6F:
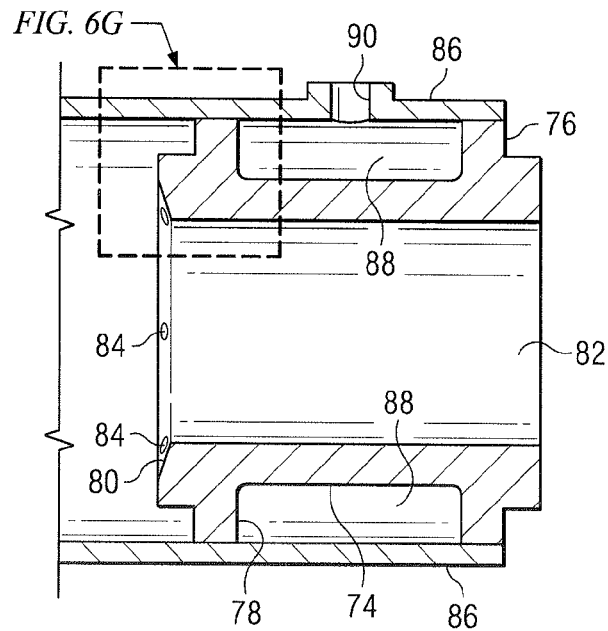
FIG. 6F is a cross-sectional view of the nozzle spool shown in FIG. 6E and taken at line 6F-6F.
Figure 6G:
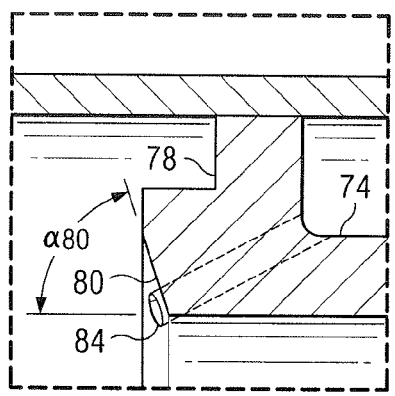
FIG. 6G is a partial magnified cross-sectional view of the highlighted portion of the nozzle spool shown in FIG. 6F.
Figure 7:
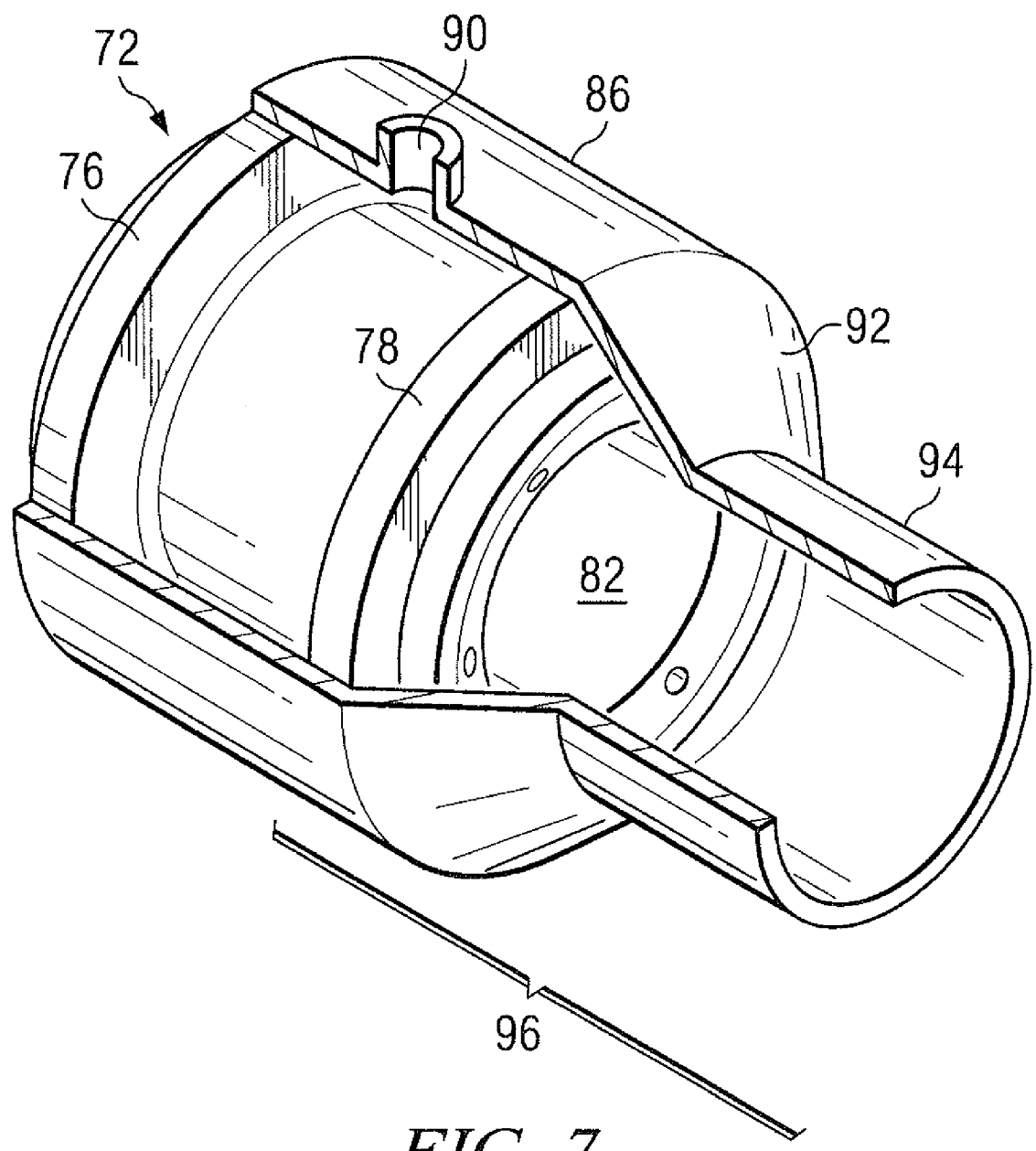
FIG. 7 is a perspective view of a compressed-air cowling and a throat extension with portions cut-away to reveal the nozzle spool contained therein in accordance with a preferred embodiment.

Referring to all of the figures—that is, FIGS. 1, 2, 3, 4, 5, 6A, 6B, 6C, 6D, 6E, 6F, 6G, and 7—a pneumatic seasoning system in accordance with a preferred embodiment has the following general elements: a seasoning hopper 4 for supplying a seasoning powder 2; a seasoning feeder 8 for feeding metered amounts of seasoning 2 into the seasoning system; a pneumatic eductor 12 propelled by an air flow, which air flow can be supplied using dry compressed air, turbine-propelled air, or other sources known to those skilled in the art; a funnel 10 for directing said metered amounts of seasoning 2 from the seasoning feeder 8 into a low pressure suction area of the pneumatic eductor 12, thereby propelling seasoning 2 in a fluidized air-and-particle flow—preferably a dilute-phase pneumatic flow; a first transport tube 16 leading the fluidized flow out from the pneumatic eductor 12 towards at least one line splitter for dividing the flow into at least two streams—i.e. a second transport tube 20 and a third transport tube 22; and a seasoning distributing nozzle at the end of each transport tube carrying its respective fluidized flow stream. Each transport tube leading directly to a nozzle gently curves to redirect the fluidized flow roughly 90-degrees so that the downstream portion of the seasoning apparatus (beginning with the first transport tube 16 after the eductor 12) can be positioned within a rotatable seasoning drum 64 with the nozzles pointing towards food product 60 within the seasoning drum 64. The nozzles are preferably arranged at equidistant intervals along a line running down the length of the drum 64. As is well known in the art, the drum 64 preferably has a slight downward tilt (from entrance to exit) to help move the product pieces 60 downstream as they tumble within the drum 64, particularly in continuous systems where the product 60 to be seasoned is continuously introduced into the drum 64 at its upstream, upper end.

The general elements listed above are discussed in greater detail in the following paragraphs with relation to a preferred embodiment of the invention. Note, however, that the specific variations of the above-mentioned elements and the precise operating conditions and/or ranges are not intended to be limiting, unless otherwise stated; those skilled in the art will be capable of making obvious adjustments to suit the particular technical application at hand.

In a preferred embodiment of the present invention, seasoning 2 is supplied from a seasoning hopper 4 equipped with a level meter 6, the readings from which can be used to warn operators to re-supply the seasoning hopper 4 and/or to provide feedback in a control loop system in order to maintain an amount of seasoning sufficient to ensure that a continuous flow of seasoning 2 can be provided into the pneumatic seasoning system. At the bottom of the seasoning hopper 4, a seasoning feeder 8—which can be a volumetric feeder or a loss-in-weight feeder—supplies metered amounts of seasoning 2 into the pneumatic eductor 12 via a funnel 10. In one embodiment, for example, the seasoning feeder 8 is an auger or rotating screw. Alternatively, the seasoning feeder 8 can comprise a combination of a vibratory conveyor and weigher. In a typical application, the seasoning rate is on the order of a few hundred pounds per hour, preferably ranging from 100 (one hundred) pounds per hour to 400 (four hundred) pounds per hour.

While seasoning is supplied via a funnel 10 into the pneumatic eductor 12, an air flow (which will be the propelling carrier fluid) is provided and regulated by an air flow meter 14. To support the aforementioned seasoning rate, pressurized air is generally supplied through straight, flexible tubing (on the order of about one inch outer diameter, 0.93 inch inner diameter) within the range of 10 (ten) pounds per square inch (psi) to 75 (seventy-five) psi, more preferably between 10 (ten) psi and 35 (thirty-five) psi, and even more preferably between 10 (ten) psi and 25 (twenty-five) psi.

Note that the particular settings and characteristics of the embodiments discussed herein are based on the use of seasoning with the following approximate particle-size distribution: 25% on the order of 10 (ten) microns (in diameter), 50% on the order of 80 (eighty) microns, 25% on the order of 300 (three hundred) microns. The density of such seasoning in bulk is roughly 1800 (eighteen hundred) kilograms per cubic meter.

The seasoning and air preferably travel through the first transport tube 16 and all other transport tubes in dilute-phase pneumatic flow (as opposed to dense-phase pneumatic flow), in order to minimize particle-to-particle interactions and/or collisions. In some circumstances, however, dense-phase pneumatic transfer may be used to move easily-separated seasoning blends closer to the distribution nozzles before propelling them into a dilute-phase pneumatic flow. In such case, rather than combine the use of an eductor 12 at the front end of the system and an inline vacuum generator at the back end of the system, it may be preferable to forego the use of a front-end eductor 12 and simply rely upon a back-end inline vacuum generator. A preferred embodiment, however, benefits from both an eductor 12 and an inline vacuum generator.

The pneumatic flow preferably divides twice resulting in four equal flows. Thus, a first line splitter 18 divides the first transport tube 16 into a second transport tube 20 and a third transport tube 22, a second line splitter 24 divides flow from the second transport tube 20 into a fourth transport tube 28 and a fifth transport tube 30, and a third line splitter 26 divides flow from the third transport tube 22 into a sixth transport tube 32 and a seventh transport tube 34. Each line splitter should have an acute, gentle splitting angle (rather than a right angle or an obtuse angle) to minimize flow disturbance and resistance. For example, each line splitter angle $\alpha$ is preferably about 20° (twenty degrees). The second transport tube 20 and the third transport tube 22 have an outer diameter of 0.75 inches and an inner diameter of 0.68 inches. The fourth transport tube 28, the fifth transport tube 30, the sixth transport tube 32, and the seventh transport tube 34 have an outer diameter of 0.625 inches and an inner diameter of 0.46 inches. The fourth, fifth, sixth, and seventh transport tubes 28, 30, 32, 34 are attached to and terminate with the first nozzle 36, the second nozzle 38, the third nozzle 40, and the fourth nozzle 42, respectively. In this embodiment, the nozzle-spacing distance is 10 (ten) inches—that is, the four nozzles are spaced evenly and in a row at 10-inch intervals. Ideally, these nozzles will have a stand-off distance from the product $\chi$ to be seasoned of about 12 (twelve) inches. Thus, the seasoning system applies the seasoning 2 over a continuous area approximately 40 inches long and 10 inches wide. Note that the radius of curvature R28, R30, R32, R34 of each of the final four transport tubes 28, 30, 32, 34 is relatively proportional to its length. Also note that the inner diameter of the transport tubes decreases after each set of line splitters 18, 24, 26. To promote an even distribution of flow to each of the nozzles, it is helpful to select tube/pipe sizes and geometries to minimize any differences in tube length, and thus pressure drop and/or decrease in velocity, between the seasoning hopper 4 and each nozzle. Thus, it is desirable to maintain an approximately constant cross-sectional area of flow, as well as an approximately constant pressure drop between the eductor 12 and each nozzle. To compensate for the longer length of the fourth transport tube 28 compared to the shorter length of the fifth transport tube 30, the even shorter length of the sixth transport tube 32, and still shorter seventh transport tube 34, the radius of curvature R28 of the 90° elbow section of the fourth transport tube is more gentle, and thus larger, than the radius of curvature R30, R32, R34 in each of the other three transport tubes. In this particular embodiment, for example, the radii of curvature for the transport tubes are as follows: the radius of curvature for the fourth transport tube is 8.0 inches; the radius of curvature for the fifth transport tube is 7.0 inches; the radius of curvature for the sixth transport tube is 6.0 inches; and the radius of curvature for the seventh transport tube is 5.0 inches. The straight outlet distances D28, D30, D32, D34 leading from the elbow sections to the nozzles are as follows: the straight distance (to the first nozzle) D28 for the fourth transport tube is 5.7 inches; the straight distance (to the second nozzle) D30 for the fifth transport tube is 5.6 inches; the straight distance (to the third nozzle) D32 for the sixth transport tube is 5.7 inches; and the straight distance (to the fourth nozzle) D34 for the seventh transport tube is 6.0 inches.

Compressed air 44, 46, 48, 50 is supplied via quarter-inch tubing to each of the four nozzles and is used to generate an in-line vacuum to draw and further propel the pneumatic flow of seasoning out of the nozzles and onto the product to be seasoned. The compressed air pressure typically ranges from 0 (zero) to 60 (sixty) psi, but more preferably ranges from 10 (ten) to 20 (twenty) psi. During operation, the amount of compressed air delivered to each of the four nozzles can be independently monitored and adjusted, thereby enabling independent control of vacuum forces in each nozzle. This can be particularly useful in situations where one or more nozzles become temporarily plugged or otherwise malfunctions.

The pressures, tube sizing, and geometries throughout the system should be carefully selected to ensure that the fluidized flow of seasoning is always maintained at a velocity greater than the saltation velocity—i.e. the velocity at which fluidized particles begin to settle out from the fluid. When this particular embodiment was tested, the saltation velocity was typically observed between ten feet per second and twenty feet per second (fps or ft/sec). Thus, if one were recreating this particular embodiment, care should be taken to ensure that the fluidized flow moves faster than twenty feet per second at all points in the system. The velocity of the seasoning at the nozzle exit 62 is preferably on the order of 30 (thirty) fps. This high velocity promotes superior particle adhesion onto product such as corn-masa tortilla crisps without the need for pre-seasoning oil spray.

Turning to the nozzle design, the swirl-inducing, vacuum-pulling nozzle according to the present invention provides significant improvement over existing pneumatic seasoning sprayers. By inducing a swirling motion on the seasoning plume, the plume distribution angle θ is effectively doubled, and the effective spray area is approximately tripled. The inventors have discovered that when applying a given amount of seasoning onto a given target area, it is more desirable to use nozzles that are positioned close to the target area and have a wide spraying span, as opposed to using nozzles positioned a greater distance from the target area but with a narrow spraying span. By spreading seasoning from each nozzle as far away and as evenly as possible from a relatively close range, one can reduce the volume of air required to apply a given quantity of seasoning (and reduce the volume of air affected by such application), thereby increasing efficiency and reducing the amount of dust that escapes from the seasoning drum 64.

Each nozzle generally has the shape of a spool, wherein the nozzle spool 72 comprises a spool core 74 (the main cylindrical portion) having a first flange 76 at the upstream end, a first flange 78 near the downstream end, and a central passage 82 through which the fluidized seasoning flow passes during seasoning delivery. At the downstream end of the spool core 74, and defined between the outer surface of the spool core and the inner surface of the spool core (which inner surface of the spool core itself defines the central passage 82), is a beveled, annular face 80. The annular face 80 has a bevel angle α80 of approximately 15°, when measured from a hypothetical end plane, and approximately 75°, when expressed relative to the centerline of the spool core. A plurality of swirl ports 84 pass through portions of the down stream end of the nozzle spool 72, beginning at the junction of the upstream side of the first flange 78 and the outer surface of the spool core, leading to and appearing about the annular face 80. These swirl ports 84 are evenly distributed around the annular face 80; in this particular embodiment there are six swirl ports 84, but a greater or a fewer number of ports are possible. Each swirl port preferably has a pitch angle α84 of 15° (pointing roughly towards the geometric centerline of the spool core at some distance downstream beyond the end of the nozzle spool 72) and a yaw angle τ84 of 15° (in a counterclockwise direction when looking at the annular face 80; the direction does not matter as long as it is consistent throughout the spool). When the exit ends of each swirl port are evenly distributed around the annular face 80, the radian interval Φ between each swirl port is 60°.

In a preferred embodiment, the nozzle spool 72 is made of stainless steel and has the following dimensions: an overall spool length L72 of 1.26 inches; a flange section length L76-78 of 1.02 inches (measured from the upstream side of the first flange 76 to the downstream side of the first flange 78); an overall nozzle spool diameter (which corresponds to the outer diameter of the flanges OD72) of 1.88 inches; a spool core diameter D74 (which is the outside diameter of the spool core in the section between the first flange 76 and the first flange 78) of 1.0 inch; a slightly larger 1.127 inch outer diameter at the spool core end OD74; and an inner diameter of the spool core ID72 of 0.75 inch.

A compressed-air cowling 86 slips snugly around the nozzle spool and spans from the first flange 76 to the first flange 78, thereby encircling the spool core 74 and defining an annular swirl-port-feeding chamber 88 between the inner surface of the compressed-air cowling 86, the outer surface of the spool core 74, the downstream side of the first flange 76, and the upstream side of the first flange 78. When in use, compressed air enters the annular swirl-port-feeding chamber 88 via a compressed air inlet 90. The compressed air then passes through the swirl ports 84 in a swirling fashion akin to a swirling collar of air surrounding the fluidized flow of seasoning. Because the air exiting the swirl ports 84 is traveling faster than the fluidized flow of seasoning 2 exiting the central passage 82 of the spool core, the air exiting the swirl ports 84 creates a vacuum that pulls and further propels the seasoning. If desired, the cowling 86 can extend beyond the downstream end of the spool to act as a throat extension 96. This throat extension 96 comprises a tapering portion 92 of the cowling and a cowling outlet 94. In some cases, the use of such a throat extension 96 (such as a 0.5 inch to a 1.0 inch extension) can help reduce dust generation at the plume boundary and near the nozzle exit 62 without significantly reducing the plume size. A throat extension 96 can also be used to increase the volume of induced air flow generated by each nozzle.

When the seasoning apparatus is properly positioned within the rotatable (or rotating, when in use) seasoning drum 64, the nozzles are aligned in a row parallel to the longitudinal axis of the rotatable (or rotating, when in use) drum 64. The nozzles should be positioned such that they will be roughly 12 (twelve) inches from the surface of the expected product bed height (or whatever the desired stand-off distance from the product χ is). The nozzles are optionally but preferably canted so that the seasoning 2 impacts the product at approximately 30°. To promote the tumbling of product being seasoned, the rotating drum 64 should have longitudinal baffles 66 (weirs, or "flights") spaced throughout the interior of the drum 64. If desired, the pneumatic transport tubes can be secured by support bracing 68 and/or enclosed together in conduit 70. During the seasoning process, the food product to be seasoned is conveyed into the upstream end and/or the higher end of the drum 64, at which point the rotation of the drum 64 begins to tumble the product. Meanwhile, the nozzles deliver a constant and uniform flow of seasoning particles to the tumbling product. As the product pieces tumble, they also move downstream, longitudinally down the interior of the rotating drum 64, until they exit the drum 64 for further processing.

The exact dimensions and angles discussed above may vary depending on the application. Note, however, that for certain parameters, particularly the pitch angle α84 and yaw angle τ84 of the swirl ports 84, extreme departure from the preferred embodiment may be detrimental to seasoning efficiency. For example, when the pitch angle α84 of the swirl ports 84 approaches 30°, the compressed air exiting the swirl ports 84 will no longer generate a useful vacuum. In any case, the pitch angles α84 and yaw angles τ84 should be non-zero.

While the invention has been particularly shown and described with reference to a preferred embodiment, it will be understood by those skilled in the art that various changes in form and detail may be made therein without departing from the spirit and scope of the invention.

We claim:

1. A seasoning method for pneumatically propelling and uniformly distributing a seasoning onto a food product to be seasoned, said method comprising the following steps:

a) providing metered amounts of the seasoning from a bulk seasoning source;

b) introducing said metered amounts of the seasoning into a pneumatic eductor for enclosed pneumatic transfer downstream;

c) propelling the seasoning along a first gaseous flow and through the pneumatic eductor, where the seasoning and the first gaseous flow thereafter constitute a fluidized seasoning flow;

d) pneumatically transferring the fluidized seasoning flow toward at least a first nozzle, wherein each nozzle is an in-line pneumatic vacuum nozzle comprising: a spool core, through which the fluidized seasoning flow passes wherein the step of pneumatically transferring the fluidized seasoning flow further comprises splitting said fluidized seasoning flow at least once and wherein the flow is split prior to entering each nozzle; and a plurality of swirl ports distributed about the circumference of the spool core;

e) expelling a second gaseous flow from the swirl ports in a swirling fashion and at a velocity greater than that of the fluidized flow, such that the second gaseous flow generates a vacuum that pulls, swirls, and propels the seasoning from the fluidized flow outward from each nozzle, thereby forming a turbulent, swirling plume of seasoning; and f) directing said turbulent, swirling plume of seasoning onto said food product to be seasoned.

2. The seasoning method of claim 1, wherein said first gaseous flow comprises air, and said second gaseous flow comprises air.

3. The seasoning method of claim 1, and further wherein a constant overall cross-sectional area of transfer is maintained throughout the step of pneumatically transferring the fluidized seasoning flow.

4. The seasoning method of claim 1, wherein the step of pneumatically transferring the fluidized seasoning flow further comprises splitting said fluidized seasoning flow at least once into at least two transport tubes, and further wherein an identical pressure drop is observed between the pneumatic eductor and the exit of each transfer tube.

5. The seasoning method of claim 1, wherein each one of the swirl ports has a non-zero pitch angle and a non-zero yaw angle relative to the axis of the spool core.

6. The seasoning method of claim 1, wherein said fluidized seasoning flow is a dilute-phase pneumatic flow.

7. The seasoning method of claim 1, wherein said fluidized seasoning flow has a velocity of at least twenty feet per second during the step of pneumatically transferring the fluidized seasoning flow.

* * * * *